UNITED STATES PATENT OFFICE.

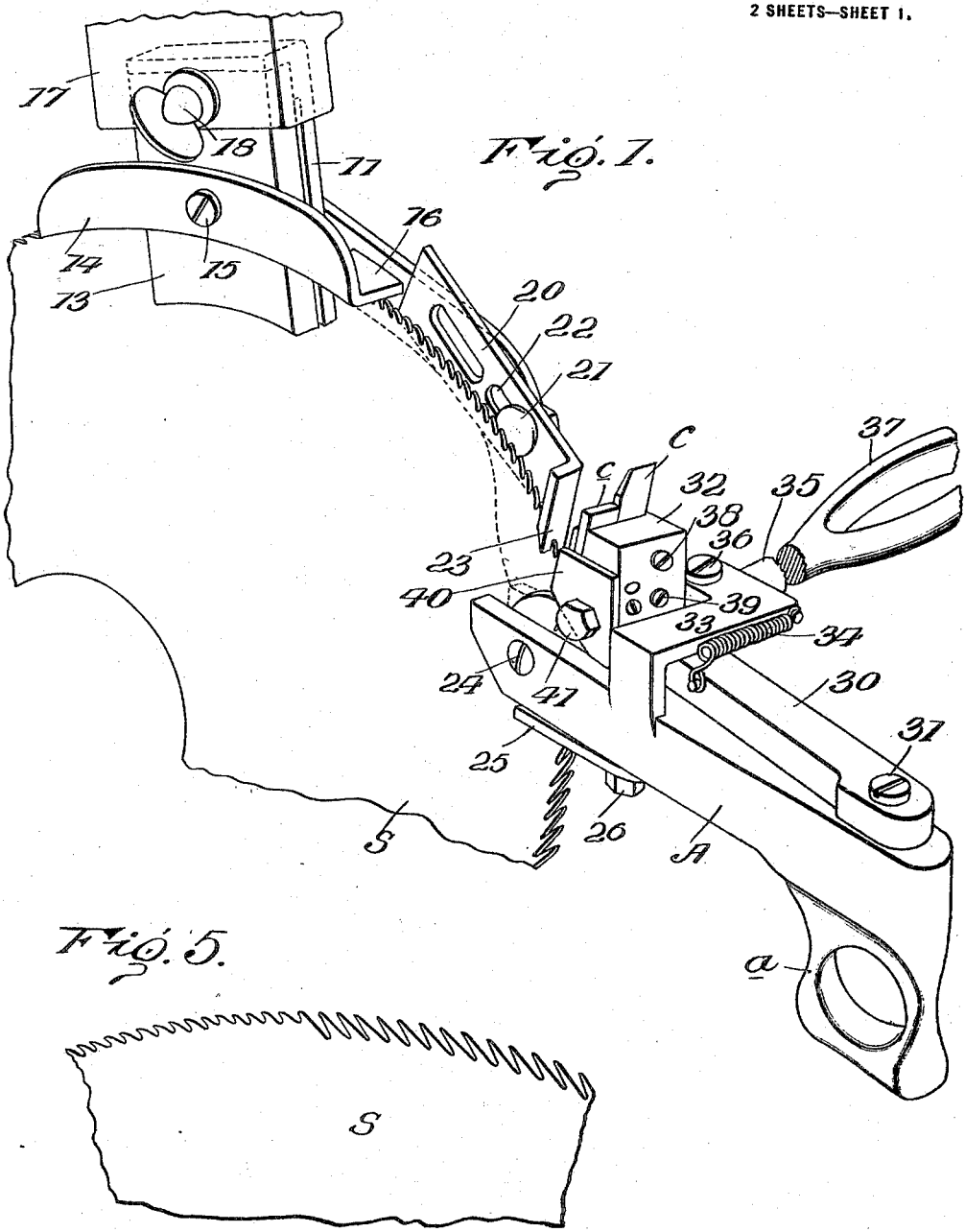

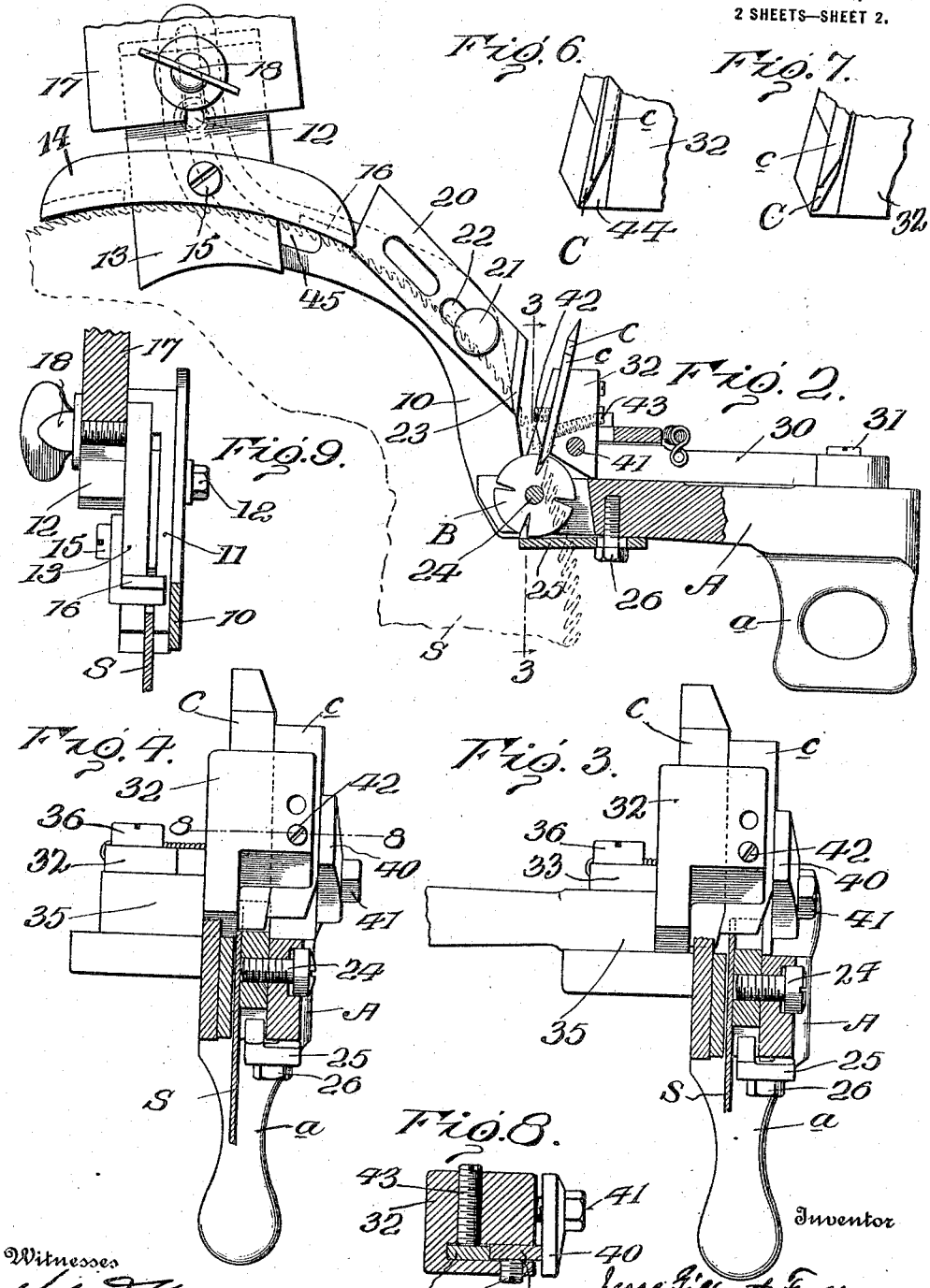

JESSE GILBRETH FALLS, OF MEMPHIS, TENNESSEE.

GIN-SAW GUMMER.

1,216,299. Specification of Letters Patent. Patented Feb. 20, 1917.

Application filed February 24, 1914. Serial No. 820,688.

*To all whom it may concern:*

Be it known that I, JESSE GILBRETH FALLS, a citizen of the United States, residing at Memphis, Shelby county, and State of Tennessee, have invented and discovered certain new and useful Improvements in Gin-Saw Gummers, of which the following is a specification.

My said invention consists in certain improvements in saw gummers and sharpeners especially designed for gumming and sharpening gin-saws, of that particular type shown in my former Patent No. 419,989, whereby convenience in operation, accuracy in results and various other advantages are secured, all as will be hereinafter more fully described and claimed.

Referring to the accompanying drawings, which are made a part hereof, and on which similar reference characters indicate similar parts, Figure 1 is a perspective view of a portion of a gin-saw with my gummer and sharpener thereon in the position it occupies while in use and illustrating the method of use, Fig. 2 a side elevation of the same with parts of the tool shown in section to illustrate the construction more clearly, Fig. 3 a view partly in cross-section as seen when looking in the direction of the arrow from the dotted line 3—3 in Fig. 2, showing the position of the cutter before the operation on the saw, Fig. 4 a similar view showing the cutter in operated position, Fig. 5 a side elevation showing a portion of a saw, part of which has been operated upon by the tool and showing the teeth gummed and sharpened, and the balance as they appear before they have been gummed and sharpened, Figs. 6 and 7 detail views of the cutter and its holder in side elevation, Fig. 8 a detail cross section on the dotted line 8—8 in Fig. 4, and Fig. 9 a detail edge view of a portion of Fig. 2.

In said drawings the portions marked A represent the frame of the tool, B the die, and C the cutter, or punch.

The frame consists of a main member A adapted to form a handle and support the operating parts. It preferably has a depending member *a* which is adapted to serve as a handle in the operation of the device. A curved arm 10 extends upwardly from the forward end of the main frame member A and carries a supporting guide on its upper end consisting of an upright 11 adjustably secured by a clamping screw 12 to said member 10. Said clamping screw is mounted in a slot in the curved end of said member 10, whereby the position of said guide may be adjusted. A second member 13 is secured to said member 11, a space being allowed between them sufficient to accommodate the thickness of the saw. A curved plate or guide member 14 is attached to member 13 by means of a screw 15 on which it is adapted to pivot freely. Said guide member 14 is formed with horizontal projecting wings 16 which extend over the periphery of the saw and are adapted to rest upon the ends of the teeth thereof. A balancing weight 17 is attached to the upper end of member 11 by means of a set screw 18, which also serves to secure the members 11 and 13 together. One of said members is formed recessed near its upper end, as best shown in Fig. 1, to provide for the slot or space between members 11 and 13. A guide and support 20 is also adjustably mounted on arm 10 by means of a screw 21 extending through a slot 22 in the arm. Said guide has a transversely extending end 23 with a tapered lower end, adapted to engage the teeth and support the tool in position while the punch or cutter is being operated.

The die B is circular and mounted on a pivot screw 24 in an appropriate slot in the front of the main frame member A. It is provided with a series of tapered notches in its periphery, four being shown, through which the punch is adapted to operate. Said die is held in adjusted position by a dog 25 secured to the under side of said member A by means of a screw 26, and having a tapered point adapted to engage with one or the other of said tapered notches. By this means the circular die is held rigid while in use, but may be turned to bring first one and then another of the V-shaped notches into position for use.

A swinging arm 30 is mounted on a pivot 31 on the top of the frame member A. Its forward end carries a head 32 which is formed recessed to receive the cutter or punch, as will be presently described. An arm 33 secured to or formed in piece with the frame member A, extends upwardly from said frame member and across the top of said arm 30, and for a distance to the opposite side of said frame member. A spring 34, connected at one end to said arm and at the other end to the outer end of said arm 33, normally holds the swinging arm 30 to one side of the normal position of the saw in operation. A cam 35 with a lever 37 formed therewith is mounted on a pivot 36 on the end of arm 33 with its cam edge adapted to bear against the outer face of the swinging arm 30, whereby it may be operated against the operation of the spring 34.

The punch or cutter C is a hardened steel plate of appropriate form, preferably made in the same form at each end so that in practice it may be reversed after one end has become dull or worn, and the other end used. Said cutter is mounted in a transverse groove in the head 32 of the arm 30 and secured in vertical adjustment by means of set screws 38 and 39. A cutter guide c is mounted alongside said cutter C, in the same groove, and is clamped transversely against said cutter, which in turn is clamped against the inner wall of the groove, by means of a clamping plate 40 adapted to be forced against the outer edge of said guide C by a screw 41, which screws into a perforation in the outer face of head 32. The lower end of the groove 44, in which said guide c is mounted, is wider at its lower end than at its upper end, and the lower end of said guide is held in desired adjusted position by means of set screws 42 and 43 adapted to bear upon its opposite sides near its lower end. By this means said guide c may be thrown back and forth at its lower end from the position shown in Fig. 6 to the position shown in Fig. 7, or any intermediate position, for a purpose to be presently described.

The pitch of the teeth may be regulated by adjusting the weight 17 through the medium of set screw 12 in the slot 45 which will tilt the tool more or less in relation to the teeth.

The operation of my said invention is as follows:

The tool is placed upon the saw as indicated in Figs. 1 and 2. This is done without removing the saw from the gin cylinder, or disturbing their normal relation to each other. The guide 20 is adjusted on the arm 10 by means of the set screw 21 so that the lower edge of its transverse engaging end 23 will be spaced from the cutter to engage the throat of a tooth the desired distance in advance of the operation of said cutter. The members 11 and 13 of the forward guide embrace the saw while the member 14 rests upon the points of the teeth and supports the tool. The weight 17 is adjusted to draw the tool against the front edge of the saw and hold it secure during the operation.

The saw blade passes into the recess of the front end of the frame member A and rests against one side face of the circular die B. The cutter guide c alongside the cutter C rests in the throat of the tooth which is to be operated upon by the cutter, and, except as will be presently explained, acts also as a gage to determine the depth to which the cutter will operate into the body of the saw. The cutter C is adjusted longitudinally in its support to project that distance below the point of the guide c which it is desired to deepen the throat of the saw teeth. The operator then through the medium of the lever 37 and cam thereon forces the forward end of the swinging arm 30, carrying the head 32 and cutter C, across the path of the saw, the cutter cutting through the body of the saw and punching out a V-shaped piece of metal at the base of the tooth, deepening the throat as desired, as indicated most clearly by comparing the two portions of the edge of the saw S illustrated in Fig. 5. The spring 34 operates to withdraw the cutter from the tooth, when the operator slides the tool forward until the combined guide and support 23 engages behind the next succeeding tooth and the combined guide and gage c likewise is engaged behind the next tooth, when the operation is continued. In this manner the teeth throughout the circumference of the saw may be gummed out and sharpened successively in a rapid, convenient, and uniform manner.

The guide and support 23 coöperates to a large extent with the guide c, first in supporting the tool, and again in gaging the depth of the cut. In many saws it will be found that there are waves or hollows caused by former imperfect filing, and in such cases the front guide 23 will prevent the guide c from falling into the deeper throat or hollow and thus gage the depth to which the cutter will go into the body of the saw. Thus after several sharpenings by this tool of old saws, rendered irregular in contour and in the shape of teeth by faulty filing, the regular contour of the saw and uniform form and size of the teeth will be restored as they were when the saw was new. In ginning cotton it is important that the teeth of the ginning cylinders be uniform in length and these features are thus of importance in the construction and operation of this tool. It is also important that the teeth be of uniform shape, and depth, and this is accurately accomplished by the forward or backward adjustment of the lower end of the cutter guide c through the adjustment of the set screws 42 and 43, the backing of one screw and advancing of the other operating to swing the lower end of said guide, as will be readily understood, and thus throw the cutter backward or forward in relation to the tooth so as to remove more or less of its back or front according to any irregularity caused by faulty filing. When one end of cutter C has become incapacitated for use by wear, it can be reversed and the opposite end used, and likewise the circular die B can be adjusted to bring the various notches of its periphery into use successively.

Thus a tool is provided capable of rapid use whereby the saws may be kept in perfect condition by anyone and at a comparatively small expense.

Having thus fully described my said invention, what I claim as new and desire to secure by Letters Patent is:

1. In a gin-saw gummer the combination of a support, an arm fixedly mounted on said support and disposed transversely thereof and spaced therefrom, an arm pivotally mounted on the support and movable within said space, said pivoted arm provided with a head having a groove formed therein widened at its base, a saw-tooth cutter located in said groove, a pair of set screws on the head engaging with said cutter adapted for adjusting the same to cut at different widths, a cutter guide located in the groove adjacent said cutter, set screws on the head engaging with said cutter guide for adjusting the same, a clamping plate, secured to the head and engaging with the outer edge of said cutter guide, a lever for actuating the cutter carrying arm mounted on said fixed arm, a retraction spring for the cutter connected to said cutter carrying arm and said fixed arm, and means for mounting the support on a saw, substantially as set forth.

2. In a gin-saw gummer the combination of an arm, a saw-tooth cutter mounted on said arm, means for operating said cutter, a member adjustably mounted on the arm, a member secured to said adjustable member and spaced therefrom to receive the saw, and a curved plate pivotally mounted on one of said members provided with laterally projecting wings adapted to rest upon the teeth of the saw and support the arm, substantially as set forth.

In witness whereof, I have hereunto set my hand and seal at Memphis, Tennessee this 16th day of February, A. D. nineteen hundred and fourteen.

JESSE GILBRETH FALLS. [L. S.]

Witnesses:
EMMA M. WILKINSON,
JOHN W. FARLEY.

Copies of this patent may be obtained for five cents each, by addressing the "Commissioner of Patents, Washington, D. C."